United States Patent [19]

Magel

[11] Patent Number: 5,199,088
[45] Date of Patent: Mar. 30, 1993

[54] FIBER OPTIC SWITCH WITH SPATIAL LIGHT MODULATOR DEVICE

[75] Inventor: Gregory A. Magel, Dallas, Tex.

[73] Assignee: Texas Instruments Incorporated, Dallas, Tex.

[21] Appl. No.: 815,454

[22] Filed: Dec. 31, 1991

[51] Int. Cl.⁵ .................................................. G02B 6/28
[52] U.S. Cl. ......................................... 385/18; 385/19; 385/47; 385/24
[58] Field of Search ....................... 383/18, 24, 47, 19, 383/20

[56] References Cited

U.S. PATENT DOCUMENTS

| 4,449,782 | 5/1984 | Korth | 385/24 |
| 4,498,730 | 2/1985 | Tanaka et al. | 385/18 |
| 4,722,582 | 2/1988 | Modone et al. | 385/47 |
| 4,938,555 | 7/1990 | Savage | 385/18 |

Primary Examiner—John D. Lee
Assistant Examiner—S. Barns
Attorney, Agent, or Firm—Julie L. Reed; James C. Kesterson; Richard L. Donaldson

[57] ABSTRACT

A switch for coupling a row of three input/output optical fibers. The switch is based on a spatial light modulator device, having a tiltable mirror element, with a grazing mirror layer, a lens layer, and a fiber holder layer assembled on top. The grazing mirror layer directs light to or from the outer fibers to or from the tiltable mirror and permits the fiber holder layer to hold the axes of the ends of the fibers parallel to each other. The lens layer is interposed between the fiber holder layer and the grazing mirror layer for coupling light into and out of the fibers.

21 Claims, 4 Drawing Sheets

FIBER OPTIC SWITCH WITH SPATIAL LIGHT MODULATOR DEVICE

RELATED PATENT APPLICATIONS

The following patent application is related to the present application, and is incorporated by reference herein:

U.S. Ser. No. 723,105, "Apparatus and Method for Optical Switching" (now U.S. Pat. No. 5,155,778).

TECHNICAL FIELD OF THE INVENTION

This invention relates to fiber optic transmission equipment, and more particularly to an optical fiber switch based on a spatial light modulator device.

BACKGROUND OF THE INVENTION

With the increasing use of fiber optics for communications, a need has arisen for improved means for routing signals carried by optical fibers. Switching for these fibers has previously been achieved with optoelectronic devices. Optical fibers are coupled with circuitry that permits the switching to be done electrically, and then the electrical signals are converted back to optical signals for further transmission. The conversion processes introduce loss and distortion into the signals, and the data rate that can be handled by such switches is limited by the speed of the electronic circuitry.

Purely optical methods for fiber optic switching show promise of supporting higher data rates. One such optical method involves the use of devices based on spatial light modulator (SLM) designs, especially those having reflective elements. An SLM is an array of electronically addressable elements, each of which is capable of separate mechanical movement in response to an electrical input. In the case of reflective SLM's, incident light illuminates the surface of the SLM and is redirected in a predetermined direction by those reflective elements that are positioned to reflect the light in that direction.

Many SLM's are binary in the sense that each pixel element may have either of two states. The element may be off, which means that it delivers no light. Or, the element may be on, which means that it delivers light at a maximum intensity. Other SLM's have three states, in which light may be redirected to either of two positions. The action the SLM performs upon light is in large part dependent upon the optical system into which the SLM is incorporated.

Various SLM architectures have been developed, which include variations with respect to the type of reflective elements and the addressing circuit. Reflective element types include elastomer, membrane, and cantilever or torsion beam types. Addressing may be by e-beam input, optically, or by means of an integrated circuit. Cantilever and torsion beam architectures, in combination with integrated circuit addressing, are described in an article entitled "Deformable-Mirror Spatial Light Modulators", by Larry J. Hornbeck, published in *Proc. SPIE* 1150, pp. 86–102 (1990).

In switching applications, the SLM is used to selectively couple an input fiber to one or more output fibers. For example, in an "on/off" type switch, light from an incoming fiber may be focussed onto a mirror element, which is positioned so that it either does or does not reflect the light into an output fiber. Or, in a "one to n" routing switch, incoming light may be focussed on an array of mirror elements, which are positioned to selectively redirect the light along further paths.

A problem with using SLM's as optical fiber switches is that many existing designs are not easily and cheaply manufactured. An important consideration in many designs is how to couple light in one fiber of the switch to a mirror element of the SLM without interfering with light in the other fibers of the switch. To achieve this isolated coupling, some designs require the fibers to meet the mirror element at an angle. The designs call for a precise positioning and securing of the fibers, as well as individual alignment of corresponding lenses, during manufacture. It is also difficult to devise sufficiently compact and rigid structures to support all of these various components at an angle, particularly for routing-type switches. A need exists for an SLM-based optical switch that is more easily manufactured and that possesses good rigidity in order to withstand vibration and shock.

SUMMARY OF THE INVENTION

One aspect of the invention is a switch for optical fibers. The switch is assembled over a tilting mirror, moved to its tilted position by means of electrostatic attraction from underlying electrodes. The tilting mirror and associated electrodes may be those of a conventional spatial light modulator device. Several added layers over each tilting mirror element direct input and output light in a manner that permits the ends of input and output fibers to be aligned and parallel to each other. An optical fiber holder layer holds the ends of two outer fibers and one middle fiber in alignment. A lens layer, having a lens associated with each of the fiber ends, couples light from one or more input fibers to one or more output fibers. A spacer layer separates the fiber holder layer and the lens layer at a predetermined distance from each other above the spatial light modulator layer. A grazing mirror layer beneath the lens layer and above the tilting mirror element, has a grazing mirror associated with each of the outer fibers, for directing light to or from the outer fibers at a predetermined grazing angle. The tilting mirror is capable of being moved to a tilt angle in either of two directions to direct light to or from the outer fibers.

A technical advantage of the invention is that the switch may be easily assembled from several layers, which provide a predetermined path for input and output beams, on top of a conventional SLM device. Processing steps for creating each layer, such as cutting and polishing, are simplified by the fact that the surfaces are planar.

DETAILED DESCRIPTION OF THE INVENTION

As explained below, the invention is directed to those SLM designs that use torsion-beam or cantilever-beam type mirror elements. Although using spatial light modulators for optical fiber switching is not the application for which such devices are named, the use of the term "spatial light modulator (SLM)" is nevertheless used herein. As explained below, the invention involves the re-use of some SLM concepts. However, the invention has different structural aspects, such as its related optics, as well as operational differences.

Figure 1:
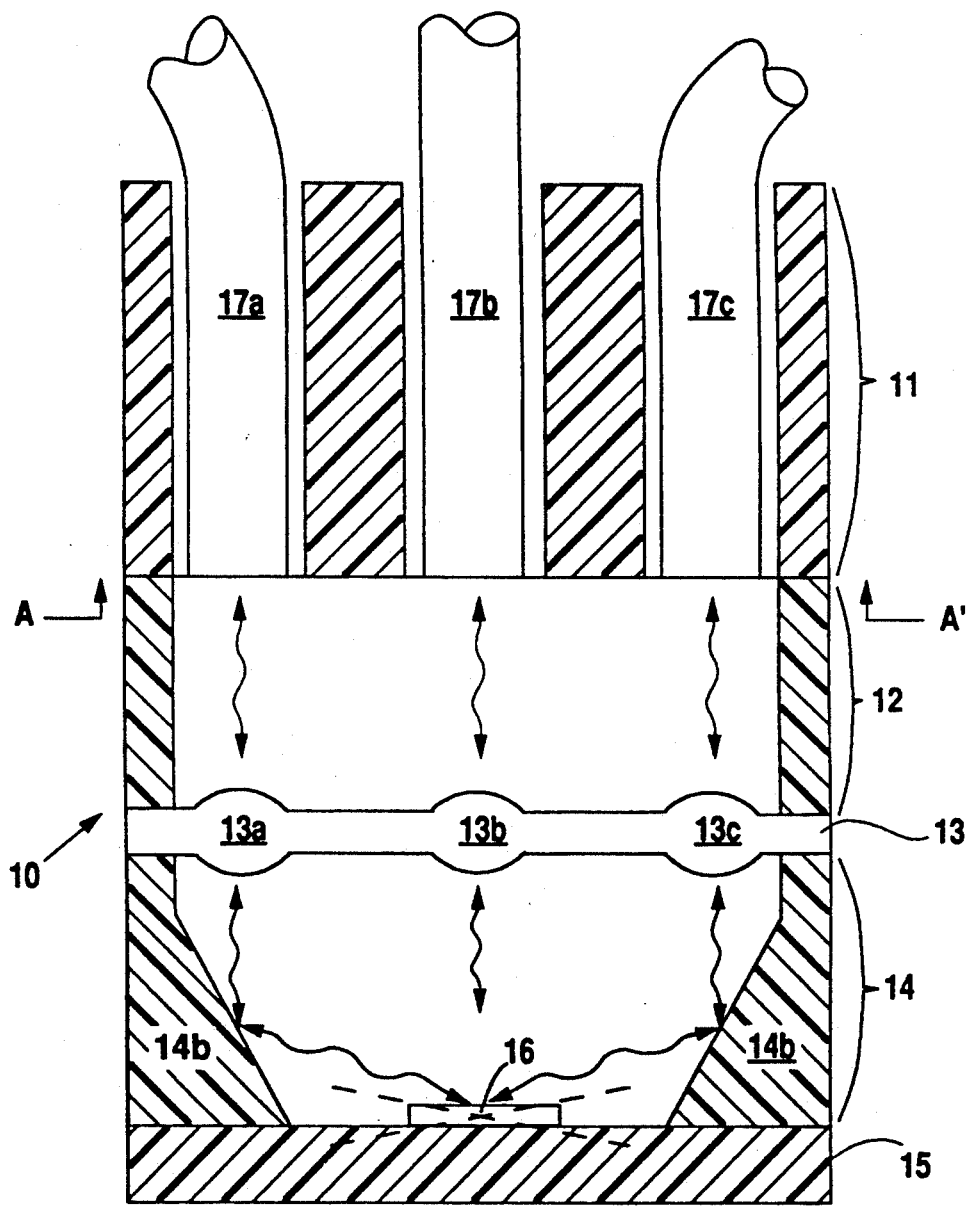
FIG. 1 is a cross sectional view of a fiber optic switch in accordance with the invention.

FIG. 1 is a cross sectional view of a fiber optic switch 10, comprised of a fiber holder layer 11, a spacer layer 12, a lens layer 13, a grazing mirror layer 14, and a tilting mirror layer 15. Tilting mirror layer 15 may be part of a SLM array having a number of tilting mirrors 16, such as explained below in connection with FIG. 4. Alternatively, switch 10 may be comprised of a single tilting mirror 16.

In operation, switch 10 is used to redirect optic beams from input and output optic fibers 17a–17c. Switch 10 is bi-directional in the sense that any fiber 17a–17c may be either an input or output channel. The direction of output light, via one of the fibers 17a–17c, depends on the tilted or un-tilted position of tilting mirror 16.

In general terms, light comes into or out of switch 10 via fibers 17a–17c, whose ends are held by fiber holder layer 11. The light is focussed by lens layer 13. Light between each outer fiber 17a and 17c and tilting mirror 16 follows a broken path that includes a point of incidence on a surface of grazing mirror layer 14. Light between middle fiber 17b and tilting mirror 16 follows a straight path through lens layer 13 to tilting mirror 16.

Typically, switch 10 is used as a single-pole double-throw switch, where, for each tilting mirror 16, one input is switched to either of two outputs. Light comes in from fiber 17b and is switched to either fiber 17a or 17c, depending on the direction in which tilting mirror 16 is tilted. However, switch 10 could also be used as a two-to-one selector for selecting between inputs from 17a and 17c to an output at 17b. Also, switch 10 could be used as an on/off switch for any two adjacent fibers, i.e., fibers 17a and 17b or 17b and 17c. Finally, if switch 10 is comprised of an array of tilting mirrors 16, any one of a number of inputs may be switched to any one of a number of outputs, as in a cross-bar switch.

Figure 2A:
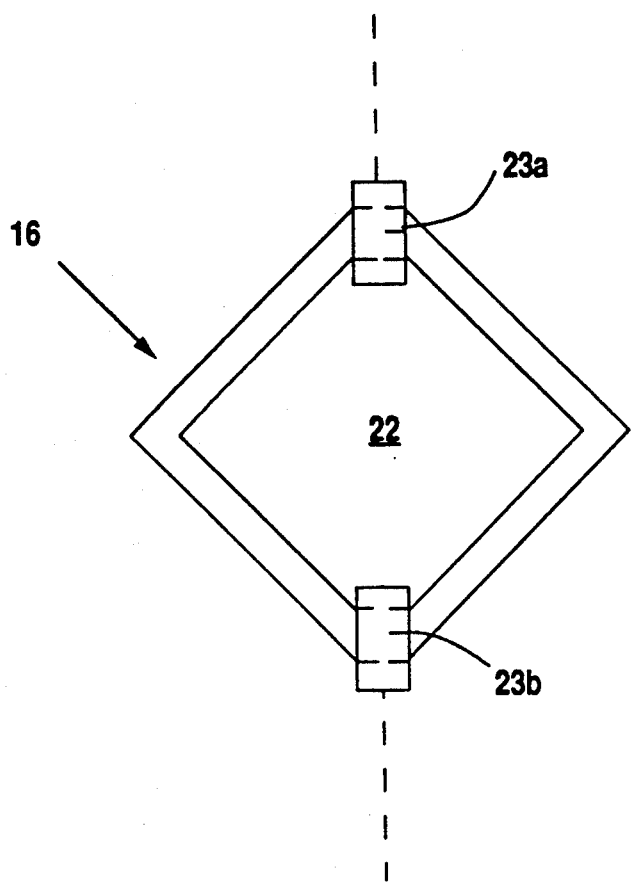
FIGS. 2A and 2B illustrate a torsion-beam tilting mirror element of a spatial light modulator device.
Figure 2B:
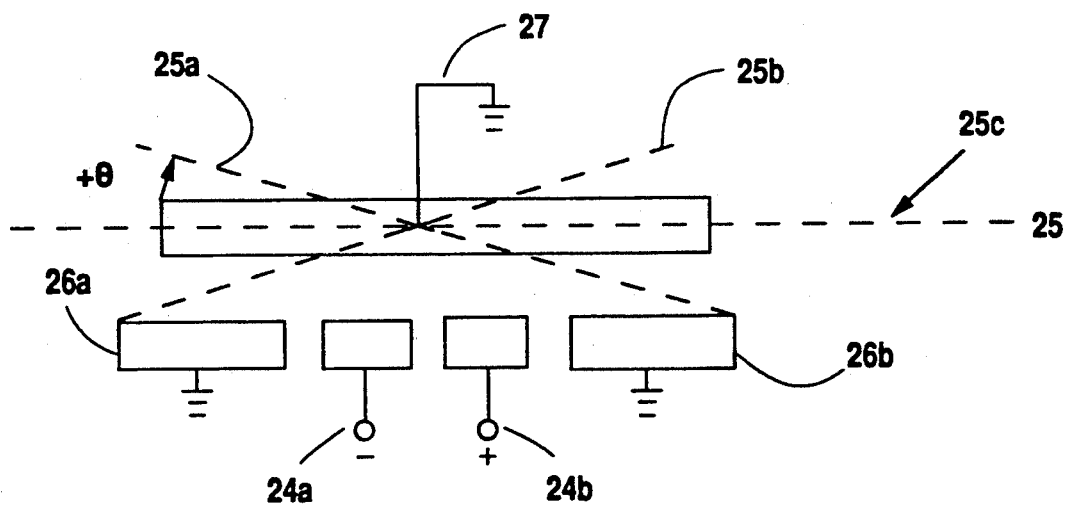
Figure 3:
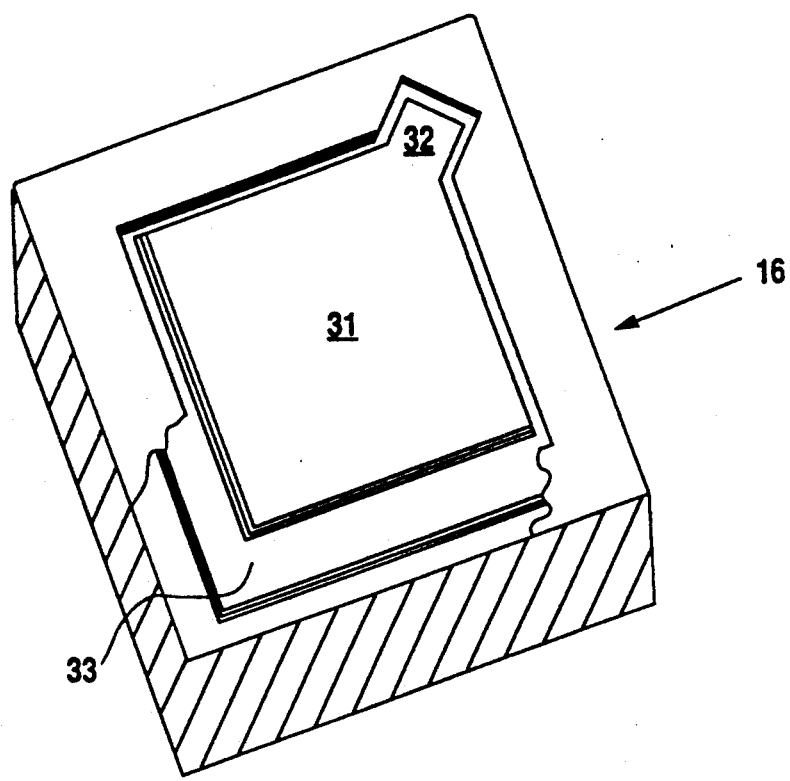
FIG. 3 is a cut-away view of a cantilever-beam tilting mirror element of a spatial light modulator device.

Switch 10 is easily implemented as a single unit, with layers 11–14 being assembled on top of a SLM device. Tilting mirror 16 of SLM layer 15 may be of a cantilever-beam or torsion-beam design, such as are explained below, or any other design that permits tilting mirror 16 to move between at least two tilted positions. FIGS. 1, 2A, and 2B illustrate a torsion-beam design, in which tilting mirror 16 may have three stable states. FIG. 3 illustrates a cantilever-beam design, in which tilting mirror 16 may have two stable states. If switch 10 is implemented with a cantilever design, switch 10 could be implemented with one tilting mirror 16 and only two input and output fibers 17a and 17b or 17b and 17c.

FIGS. 2A and 2B illustrate a tilting mirror 16 having a torsion-beam design. A thick reflective beam, i.e., mirror 22, is suspended over an air gap and connected between two rigid supports by two thin torsion hinges 23a and 23b that are under tension. When an address electrode 24a or 24b, underlying one-half of mirror 22, is energized, the torsion hinges 23a and 23b are twisted and mirror 22 rotates about the axis of the two hinges 23a and 23b.

The three stable positions of mirror 22 are shown in FIG. 2B. In one position, the edge of mirror 22 approaches landing electrode 26a and is in the tilted position represented by the dotted line 25a. Mirror 22 is moved to that position by applying the proper voltages to address electrodes 24a and 24b. A differential bias may be applied to mirror 22 through electrode 27. If an opposite voltage is applied to electrodes 24a and 24b, then mirror 22 will rotate to the position represented by the dotted line 25b. A non-tilted, i.e., "flat", position along the line 25c is achieved by applying appropriate bias voltages.

FIG. 3 is a cut-away view of a tilting mirror 16 having a cantilever-beam design. A thick reflective beam 31 is suspended over an air gap, connected by a thin cantilever hinge 32 to a rigid support. When an underlying address electrode 33 is energized, the cantilever hinge 32 bends and the beam tip is deflected toward the address electrode 33.

Regardless of whether the torsion-beam or the cantilever-beam design is used, tilting mirror 16 has a reflective surface. Ideally, this surface is fabricated as an integrated circuit layer. As an example, the hinge and beam layers may be fabricated with a "buried hinge process". An aluminum alloy that forms the hinge is sputter deposited onto the spacer layer. A masking oxide is plasma-deposited and patterned outside the areas that form the hinges. This hinge oxide is then buried by a second aluminum alloy layer that is to form the beam. Next, a masking oxide is plasma-deposited and patterned outside the areas that are to form the beams and support posts. Finally, a single plasma aluminum etch is used to pattern the hinges, beams, and support posts. The beam metal overlying the hinge region is etched away, exposing the buried hinge oxide, which acts as an etch stop. When the plasma aluminum etch is complete, regions of thin hinge metal and thick beam and support-post metal have been simultaneously patterned. Other fabrication techniques may be used, but an important consideration in ease of manufacture is the ability to form an array of tilting mirrors 16 from a single reflective layer.

Referring again to FIG. 1, an optical path unit comprised of several layers 11–14 of differently fabricated materials is assembled on top of SLM layer 15. As further explained below, several of these layers may be formed by means of known techniques, such as orientation-dependent etching. The layers are assembled together in a predetermined geometry that permits them to remain in parallel planes. Attachment of the layers to each other may be by conventional means, such as by UV or thermal curing epoxy.

The topmost layer is the fiber holder layer 11, used to hold input and output optic fibers 17a–17c in place. In the preferred embodiment, fiber holder layer is a v-groove block, which is a known means for holding a plurality of optical fibers parallel to each other with accurate spacing between them. Orientation-dependent etching of a layer of silicon is used to form v-grooves for aligning the fibers. Other designs of fiber holder layer 11 are possible, with an advantage of the invention being that the ends of the input and output fibers may be held parallel to each other.

Figure 4:
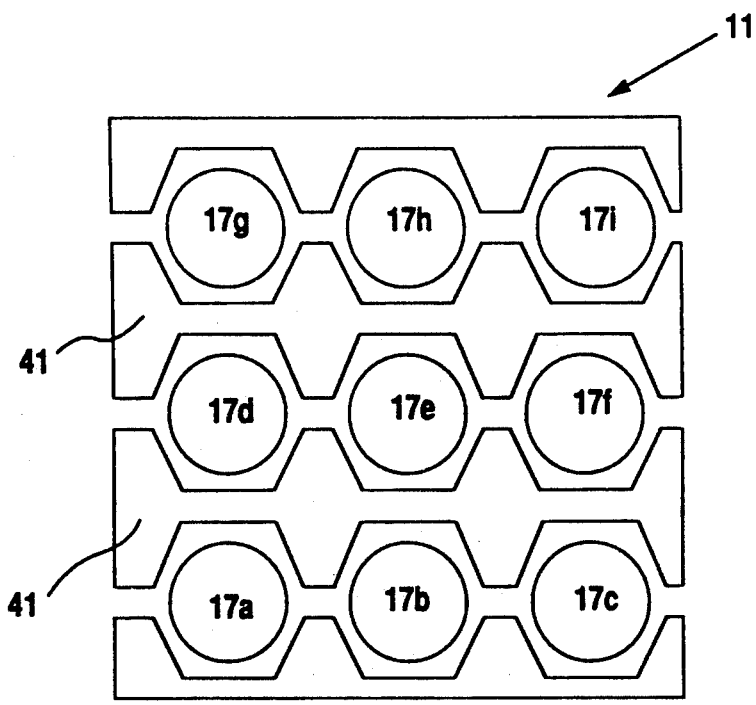
FIG. 4 is a bottom plan view of the fiber holder layer of a linear array of switches, using v-groove fiber holder sections.

FIG. 4 is a bottom plan view of fiber holder layer 11, along line A-A' of FIG. 1, where switch 10 is comprised of a linear array of three tilting mirrors 16 and fiber holder layer 11 is comprised of v-groove sections. Each row of fibers is associated with a tilting mirror 16. Thus, FIG. 4 shows the end points of fibers 17a–17c, as well as the end points of fibers 17d–17i associated with the other two tilting mirrors 16. Flat pieces of silicon 41 are etched with grooves, into which fibers 17a-17i are placed and glued. As shown, in FIG. 4, ideally, each row of fibers is clamped between two v-groove sections 41. The end points of each fiber 17a-17i may lie in the same plane at the bottom surface of fiber holder layer 11, which permits the entire bottom surface of fiber holder layer 11 to be easily polished to prepare the ends of the each fiber 17a-17i simultaneously for optimum transmission. Anti-reflection coatings may also be deposited on such a fiber and holder surface to further enhance transmission.

Referring again to FIG. 1, fiber holder layer 11 is positioned above lens layer 13 and SLM layer 15, such that each fiber 17a-17c is perpendicular to the un-tilted, i.e., horizontal, position of tilting mirror 16. Light from middle fiber 17b follows a vertical path directly from lens 13b to tilting mirror 16. Thus, when tilting mirror 16 is in its un-tilted position, light will reflect directly back into fiber 17b, thereby isolating its light from that of the other fibers 17a and 17c. It should be understood that the terms "horizontal" and "vertical" are used herein for the purpose of describing the orientation of the elements of switch 10 with respect to each other and not with respect to an external environment.

Spacer layer 12 creates an air gap between the bottom surface of fiber holder layer 11 and lens layer 13. It is comprised of a spacer wall at the outer edges of fiber holder layer 11 and lens layer 13. As explained below in connection with FIG. 5, the length of this air gap is related to the desired magnification of input and output light. The input and output beams of light to and from the ends of fibers 17a-17c are parallel within spacer layer 12 and perpendicular to the horizontal plane of tilting mirror 16 when un-tilted.

Lens layer 13 is comprised of a number of lenses 13a-c, one each associated with each fiber 17a-17c. Lenses 13a-13c are used to couple light from fibers 17a and 17c to mirror layer 14, and hence to tilting mirror 16, and to couple light from fiber 17b to tilting mirror 16. Each lens 13a-13c is of a size and shape such that the light from its associated fiber will appear on tilting mirror 16 as a spot smaller than the surface area of tilting mirror 16. This prevents loss of light. Typically, lenses 13a-13c are very small, and are implemented with microlenses. A suitable lens layer 13 could be made from an array of Fotoform lenses, which are manufactured by Corning Incorporated. Other known techniques, such as etching a semiconductor or glass plate to produce diffractive elements, may be used to form lens layer 13. As explained below in connection with FIG. 5, an advantage of the invention is that lenses 13a-13c may be co-planar with respect to each other, which facilitates the fabrication process.

As explained below in connection with FIG. 5, the embodiment of FIG. 1 has a one-to-one magnification between the light from fibers 17a-17c to tilting mirror 16. The distance from lens layer 13 to fiber holder layer 11 is the same as the distance from lens layer 13 to tilting mirror layer 15. The focal length of each lens 13a-13c is approximately one-half this distance. However, other geometries could be used in which distances and magnification are otherwise.

Grazing mirror layer 14 is comprised of angled mirrors at two opposing sides of tilting mirror 16, which deflect light from outer fibers 17a and 17c to tilting mirror 16. Grazing mirror layer 14 could be formed by means of etching and polishing a layer of silicon. Various techniques for fabricating mirrors from a silicon layer are described in U.S. patent Ser. No. 723,105, which is incorporated by reference herein. Grazing mirror layer 14 might also be made by carving or molding a trough in a layer of glass or plastic. Polishing, or deposition of reflective materials, could be performed to create a highly reflective surface. Where switch 10 is comprised of a linear array of tilting mirrors 16, grazing mirror layer 14 could be manufactured to extend along the line of tilting mirrors 16.

As explained below in connection with FIG. 5, the angle of incidence of the light from fiber 17a or 17c to the surface of mirror layer 14 is preferably the same as the tilt angle of tilting mirror 16 with respect to its non-tilted (horizontal) position. The tilt angle and the grazing incidence angle are small, i.e., in the order of 10 degrees, thus grazing mirror layer 14 forms a nearly perpendicular wall along at least two sides of switch 10. The reflective surface area of grazing mirror layer 14 at the point of incidence is sufficiently large to capture light from lenses 13a and 13c without substantial loss of light.

Figure 5:
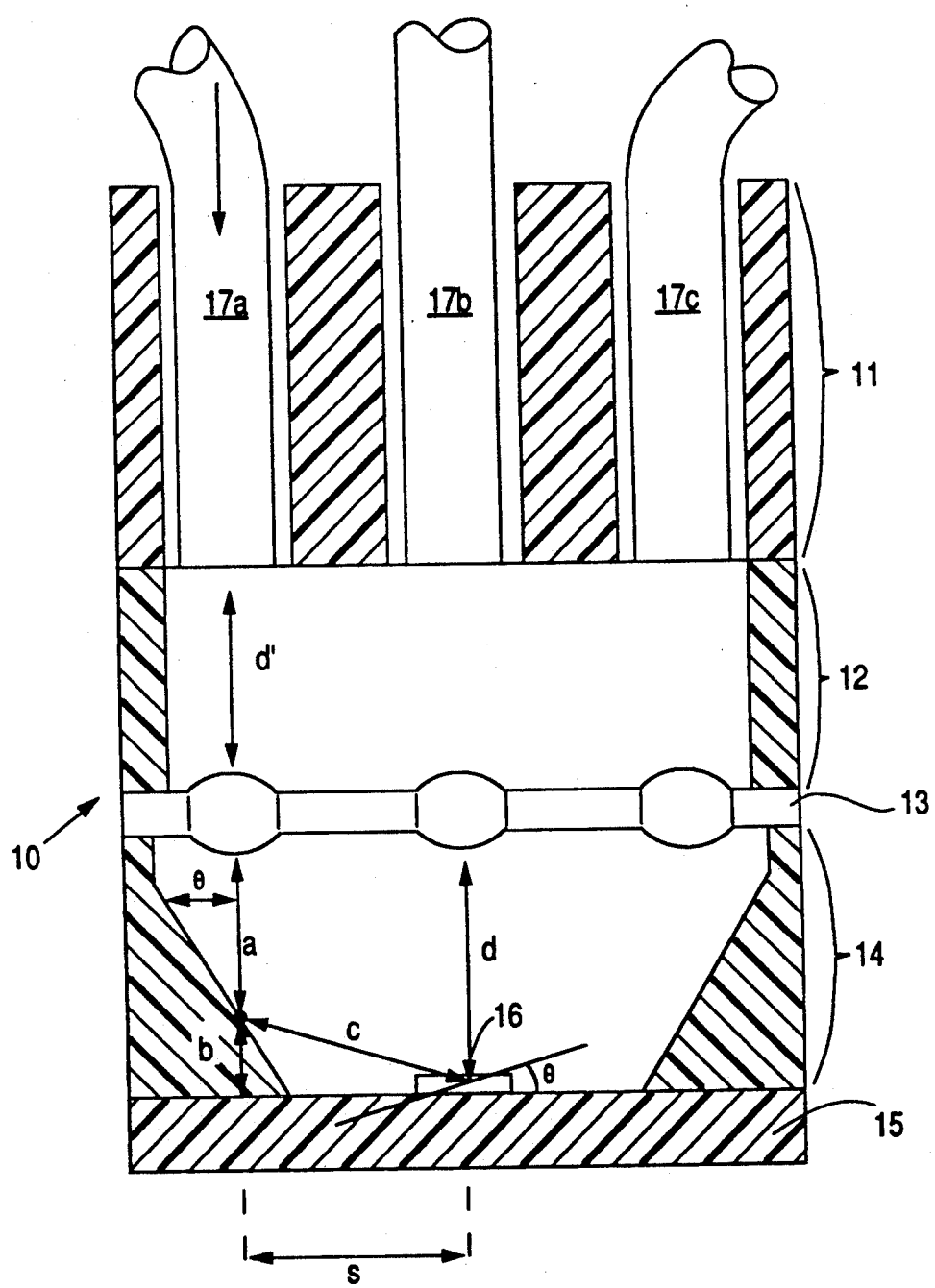
FIG. 5 illustrates the geometry of the switch.

FIG. 5 illustrates the geometry of a typical switch 10. The distance, d', is the distance between the ends of fibers 17a-17c and lens layer 13, as set by spacer layer 12. Distance, d, is the distance between lens layer 13 and tilting mirror layer 15. The two segments of d, above and below the point of incidence on mirror layer 14 from fiber 17a or 17c are labeled a and b. Segment c is the distance from either point of incidence to tilting mirror 16. The distance, s, is the distance from the center of middle fiber 17b to the center of either adjacent fiber 17a or 17c. The angle, $\theta$, is the tilt angle in either direction of tilting mirror 16, and is shown tilted in the direction of fiber 17a. The angle of incidence on grazing mirror layer 14 is also $\theta$. Stated another way, the normals to the surface of tilting mirror 16 when tilted in either direction are generally parallel to the corresponding reflective surfaces of grazing mirror layer 14.

Using known geometric calculations, it can be found that if $\theta$ is small, $$a = d - b$$
$$= d - (s/\tan 2\theta).$$

If it is assumed that $a = b$, then $$d = 2b$$
$$= 2s/\tan 2\theta.$$

Then, using an example of $\theta = 10$ degrees,
d=5.49s
c=2.92s
a=b=2.75s
As a result, $c + a = 5.67s$, which is only 1.032 times as long as d.

Where $l_1 = d$ and $l_2 = a + c$, the relationship between $l_1$ and $l_2$ can also be expressed as:

$$\frac{l_2}{l_1} = \frac{s/\tan 2\theta + s/\sin 2\theta}{2s/\tan 2\theta}$$
$$= \frac{1}{2} + \frac{1}{2} \frac{\tan 2\theta}{\sin 2\theta}$$
$$= \frac{1}{2}(1 + 1/\cos 2\theta).$$

Again, if $\theta$ is small, the ratio of $l_2$ to $l_1$ approaches unity. Thus, as indicated by FIG. 1, the distance from the end of each fiber 17a-17c to its lens 13a-13c may be the same without significant degradation of focus, and it is possible to place the ends of fibers 17a-17c in the same plane. Also, because $l_1$ is approximately equal to $l_2$, lenses 13a-13c may have the same focal length, and may be placed in the same horizontal plane.

As an example of the dimensions of a typical switch 10, using a tilt angle of 10 degrees in either direction, the distance between the centers of an two adjacent fibers 17a-17c is about 200 or 250 micrometers. The distances d and d' are each about 1 millimeter. Each lens 13a-13c is about 200 micrometers across, having a focal length of about 500 micrometers.

Other Embodiments

Although the invention has been described with reference to specific embodiments, this description is not meant to be construed in a limiting sense. Various modifications of the disclosed embodiments, as well as alternative embodiments, will be apparent to persons skilled in the art. It is, therefore, contemplated that the appended claims will cover all modifications that fall within the true scope of the invention.

What is claimed is:

1. A switch for optical fibers, comprising:
   an optical fiber holder layer for holding the ends of two outer fibers and one middle fiber parallel to each other;
   a lens layer having a lens associated with each of said ends, for coupling light to and from said ends;
   a spacer layer for separating said fiber holder layer and said lens layer at a predetermined distance from each other and above a tilting mirror;
   a grazing mirror layer beneath said lens layer and above said spatial light modulator device layer, having a grazing mirror associated with each of said outer fibers, for directing light to or from said outer fibers at a predetermined grazing incidence angle;
   a tilting mirror capable of being moved to a tilt angle in either of two directions with respect to a horizontal plane, wherein said horizontal plane is defined by a normal axis of said middle fiber, wherein said tilting mirror directs light to and from said outer fibers when in said tilted positions; and
   an electrode circuit for controlling the position of said tilting mirror.

2. The switch of claim 1, wherein said fiber holder layer is comprised of v-groove sections.

3. The switch of claim 1, wherein said lens layer is approximately equidistant between said fiber ends and said tilting mirror.

4. The switch of claim 1, wherein said grazing mirrors are nearly perpendicular to said horizontal plane.

5. The switch of claim 1, wherein said grazing incidence angle is the same as said tilt angle.

6. The switch of claim 1, wherein said fiber holder layer holds the end points of said optical fibers in said horizontal plane.

7. The switch of claim 1, wherein said grazing mirror layer is formed by cutting a trough in a layer of material.

8. The switch of claim 1, wherein said switch has an array of tilting mirrors and wherein said fiber holder layer holds input and output fibers for each of said tilting mirrors and said lens layer has a lens associated with each of said fibers.

9. The switch of claim 1, wherein said tilting mirror and said electrode circuit are part of a spatial light modulator device.

10. The switch of claim 1, wherein said tilting mirror is also capable of being held in an un-tilted position with respect to said horizontal plane.

11. The switch of claim 1, wherein said lenses of said lens layer lie in the same plane with respect to each other and wherein said lens plane is generally parallel to said horizontal plane.

12. A method of manufacturing an optical switch, comprising the steps of:
   placing a grazing mirror layer at two opposing sides of at least one tilting mirror element of a spatial light modulator device, wherein said grazing mirror layer has two grazing mirror surfaces angled upwardly from said tilting mirror element;
   placing a lens layer over said grazing mirror layer, such that a lens associated with each of three input and output optical fibers is in the same plane;
   placing a spacer layer above said lens layer for spacing said lens layer from a fiber holder layer at a predetermined distance; and
   placing a fiber holder layer above said spacer layer, for containing input/ouput fiber ends such that said ends are in the same plane.

13. The method of claim 12, wherein said step of placing said grazing mirror layer is accomplished by cutting a trough in a layer of material.

14. The method of claim 12, wherein said step of placing a lens layer is achieved by fabricating said lens layer as a unit.

15. The method of claim 12, and further comprising the step of polishing the end points of said fibers while placed in said fiber holder layer as a unit.

16. The method of claim 12, wherein said step of placing said fiber holder layer includes securing the ends of said fibers between v-groove sections.

17. The method of claim 12, and further comprising the step of placing three input/output fibers in said fiber holder layer such that their ends are parallel to each other.

18. A method of optical interconnection, comprising the steps of:
   moving tilting mirror to a predetermined tilt position;
   transmitting light through an end of an input optical fiber in a optical fiber holder plane;
   focusing said light with a first lens in a lens plane co-planar with said optical fiber plane;
   reflecting said light from said tilting mirror;
   reflecting said light from a grazing mirror at a side of said tilting mirror element;
   focusing said light with a second lens in said lens plane, wherein said second lens is co-planar with said first lens; and
   transmitting said light through an end of an output optical fiber in an optical fiber holder plane, wherein said ends of said fibers are in the same plane.

19. The method of claim 18, wherein said moving step is accomplished by tilting said tilting mirror element to approximately the same angle, with respect to its nontilted plane, as said angle of incidence of said grazing mirror.

20. The method of claim 18, wherein said steps of transmitting light through an end of an input optical fiber and through an end of an output optical fiber are determined by selecting two adjacent fibers in a row of three fibers as input and output fibers.

21. The method of claim 18, wherein said step of transmitting light through an end of an output optical fiber is determined by selecting one of an array of tilting mirrors to reflect light to said output fiber.

* * * * *